June 22, 1937.  E. L. TORNQUIST  2,084,749
METHOD OF MANUFACTURING WATER GAS
Filed Aug. 6, 1932
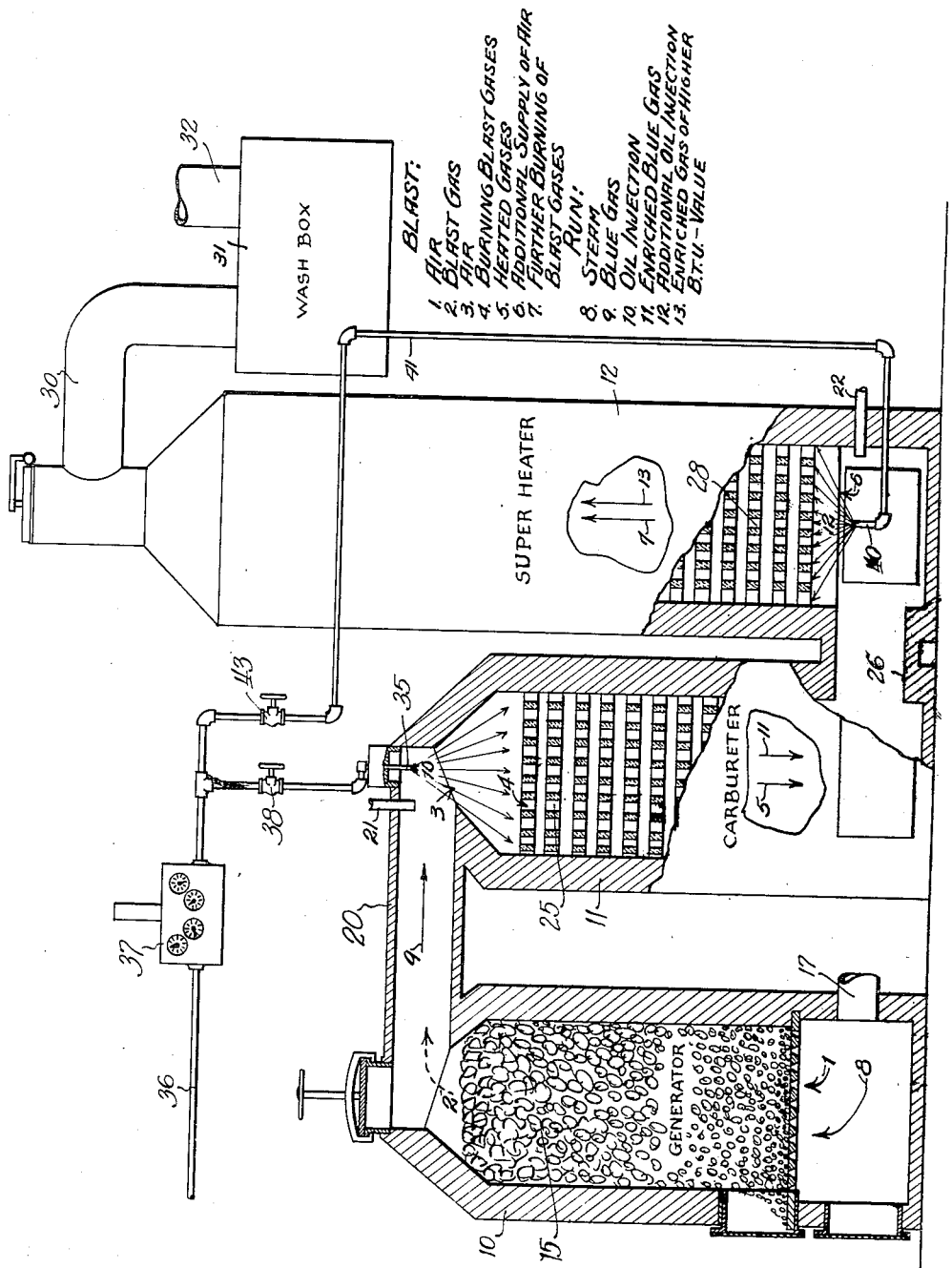
Inventor:
Earl L. Tornquist.

Patented June 22, 1937

2,084,749

UNITED STATES PATENT OFFICE 2,084,749

METHOD OF MANUFACTURING WATER GAS

Earl L. Tornquist, Elmhurst, Ill.

Application August 6, 1932, Serial No. 627,681

2 Claims. (Cl. 48—205)

The present invention relates generally to gas manufacture and is particularly concerned with the manufacture of water gas, especially water gas having a high B. t. u. content.

Water gas, as is well understood, is a mixture of gases produced by the action of steam on incandescent carbon forming, in the end, a mixture of hydrogen and carbon monoxide with quantities of carbon dioxide and other gases. In order to render such a product more practical for general purposes it is generally customary to mix with the water gas various other gases obtained from petroleum products, and generally such addition takes the form of gas oil, the resulting mixture being known as carbureted water gas.

The methods generally utilized at the present time for producing carbureted water gas include two distinct operations, one known as the blast in which carbonaceous material, such as coal, coke and the like, is heated to incandescence, and a second operation in which steam is passed through the incandescent carbon, the resulting gases being passed into a carbureter and subsequently through a superheater each comprising generally, but not necessarily, a mass of checkerwork which has been raised to high heat by the first operation. The gas oil is generally introduced onto the hot checkerwork of the carbureter and the effect of the checkerwork in the carbureter is to crack the gas oil. The resulting mixture of gases from the generator and the cracked gases is then passed through the superheater where the gases are fixed.

The introduction of the gas oil during the second operation or run causes the temperature in the carbureter to drop. Ordinarily the temperature of the checkerwork of the carbureter and the superheater is raised to approximately 1350 degrees Fahrenheit, but after the introduction of the gas oil the temperature in the carburetor may drop to 1250 degrees or less. However, the temperature of the checkerwork in the superheater does not vary to such an extent. The amount of gas oil that can be introduced during the run is limited by the drop in temperature of the carbureter. If the temperature of the latter drops too much the effect of the subsequent blast, which must be continued for some time in order to bring the relatively cool carbureter up to approximately 1350 degrees, is to overheat the superheater. This is believed to occur because as the hot gases are passed through the water gas machine during the blast not all of the heat of these hot gases is absorbed by the relatively cool carbureter, some of the heat of the gases passing over into the superheater. In order, therefore, to raise the relatively cool carbureter to the desired temperature the blast must be continued for some length of time, and the effect of the heat remaining in the gases passing out of the carbureter is to raise the temperature of the superheater beyond the point where the desired enriching gases can be produced. Thus, a limiting factor which determines the amount and characteristics of enriching gases produced during any one run is the drop in temperature of the carbureter.

Viewed in another way, the rise in temperature of the superheater is a limiting factor, because in the first place, the temperature of the superheater does not drop during the run nearly so much as the carbureter and, in the second place, if the blast is continued too long in an effort to bring the carbureter up to the desired heat the heat existing in the hot gases during the blast after they have passed through the carbureter may cause the superheater to overheat. There may exist, therefore, in the superheater a surplus quantity of heat which, in the first place, is not utilized to any useful or material extent in breaking up or cracking the gas oil or fixing the same and which, in the second place, actually may act as a more or less disadvantageous limiting factor on the thermal capacity of the set, particularly as regards the amount and characteristics of the enriching gases produced.

With these factors in mind, the present invention addresses itself to certain improvements in the manufacture of water gas, which improvements, generically speaking, contemplate utilizing in a more efficient manner this excess body of heat in the superheater and, not only to remove the effect of the same as a limiting factor on the operation of the gas machine but, also, to secure certain desirable and advantageous results from the presence of such heat.

Briefly, the present invention contemplates introducing the gas oil, which, it will be remembered, is one of the factors which causes the temperature in the carbureter to drop to a point much below the temperature of the superheater, in two or more places or points in the system during the run. Preferably these points are the carbureter and the superheater. By introducing a quantity of gas oil into the superheater directly, the effect is secured of utilizing the aforesaid mass of heat in the superheater with the result that there is secured during the second operation or run the effect of lowering the temperature of both the carbureter and the superheater. Actually, the temperature of the superheater is lowered during the run somewhat approximately as the temperature in the carbureter is lowered. Now, during the subsequent blast, which is the operation of passing heated gases through the checkerwork of the carbureter and superheater, the temperature of the carbureter is raised and the heat remaining in the gases passing out of the carbureter, which heretofore tended to overheat the superheater, is now made use of in bringing the superheater back up to but not beyond the required or desired temperature. Thus, the heat in the gases passing out of the carbureter, which formerly acted as a limiting factor on the operation of the set because they tended to overheat the superheater and throw the water gas machine out of balance, is now made use of in that the introduction of the gas oil into the superheater serves to lower the temperature thereof and therefore providing an opportunity to make use of the heat in the gases passing from the carbureter in bringing the superheater up to but not beyond the desired temperature.

The effect of arranging a water gas machine for operation in this manner is of great importance and secures a number of advantageous results. First, the thermal capacity or output in therms or other units of heating value of a given water gas machine is increased and in some cases is approximately doubled. This is a material factor in reducing the costs of production. Second, by the use of the present invention I am enabled to produce a gas having a higher B. t. u. content than was formerly practical in a water gas machine. Ordinarily, in commercial water gas the B. t. u. content has rarely exceeded 700 B. t. u. per cubic foot, but by the use of the present invention I am enabled to produce water gas having a heating value of 1108 B. t. u. per cubic foot or better. This is of considerable importance. For example, in localities served by a station in which the existing water gas machines are barely able to supply the required amount of gas, by the use of the present invention the capacity may be materially increased to take care of peak loads which may be imposed on the system.

By the use of the present invention it is also possible to supply gas having a somewhat higher B. t. u. content, and this is important in sections where the main capacity is almost exceeded. By supplying a gas having a higher B. t. u. content the same mains are enabled to adequately serve the locality where, if they were called upon to carry the required volume of the usual manufactured gas, they would be inadequate to supply the amount required.

Obviously, the present invention has other possibilities which need not be enlarged upon here. It may be mentioned, however, that the present invention is also important in localities which are already supplied with gas of a high B. t. u. content as, for example, natural gas. Many localities use natural gas either as such or as mixed with manufactured gas of 500 to 700 B. t. u. content. Natural gas is, however, not uniformly available but is supplied from certain sections of the country through pipe lines and the like to the localities desiring either to use natural gas directly or to mix the same with artificial or manufactured gas in some proportion. In such situations as this the present invention serves admirably as a source of supply in case the ordinary supply of natural gas fails, as is not unlikely where the gas is transported through pipe lines over considerable distances. A gas produced according to the principles of the present invention may be substituted for natural gas, since the B. t. u. content may be made about the same, namely, 1000 or 1100 B. t. u. per cubic foot, and gas produced according to the present invention may be delivered to the mains or may be used to be mixed with 500 or 700 B. t. u. gas during periods when the ordinary supply of natural gas has been interrupted for some reason.

The drawing illustrates only one means for manufacturing water gas in which the output in therms or other units of heating value of the machine is materially increased with the result that either the output or the B. t. u. content or both may be materially raised.

For the purpose of illustrating the principles of the present invention I have chosen a standard three shell water gas machine, but it is to be understood that the principles of my invention are just as applicable, not only to variations of the standard three shell machine, but also to many other forms of water gas machines.

In the drawing the reference numeral 10 indicates the generator of a conventional water gas machine which includes, in addition, a carbureter 11 and a superheater 12 arranged in the usual manner. The generator 10, carbureter 11 and superheater 12 are usually constructed in the form of circular chambers having an outer casing of steel or the like and lined with fire brick or other heat resistant material. The generator 10 is filled with bituminous or anthracite coal or coke, indicated at 15, and has means 17 providing for the admission of a blast of air to initially bring the coke or other fuel up to a point of incandescence. The upper portion or dome of the generator is provided with an outlet conduit 20 leading to the upper portion of the carbureter 11. An additional blast of air may be introduced into the conduit 20, as through an inlet 21, or into the superheater, as through an inlet 22, to provide sufficient combustion to raise the temperature of the gases passing from the generator to the carbureter and superheater during the blast. This utilization of additional quantities or percentages of the blast gases is one of the important features of the present invention.

The carbureter consists of a circular chamber lined with with fire brick and is generally filled with a checkerwork 25 also formed of fire brick or other heat resistant material. At its lower end the carbureter communicates, as by an outlet conduit 26, with the lower portion or base of the superheater 12. The latter comprises, like the carbureter, a circular chamber or shell lined with fire brick and filled with checkerwork 28. The top of the superheater communicates through a conduit 30 with a wash box 31 having an outlet 32 leading eventually to the supply mains (not shown).

In the operation of the water gas machine as such, the first step is to bring the coke, anthracite or other fuel 15, piled in the generator, to a vigorous combustion by subjecting the same to a blast of air. The passage of air through the bed of hot carbon produces a gas known as blast gas. This gas is carried through the conduit 20 to the carbureter at which point secondary air is added through inlet 21 and the gas burned as it passes through the carbureter and superheater. This process, known as the blast, is shown by the dotted line arrows and the accompanying legends in the drawing and is continued until the checkerwork of the carbureter and the superheater are raised to a high heat.

The second step is to pass steam through the incandescent bed of carbon and is known as the run. The steam is decomposed by the hot carbon into a mixture of gases and the reactions resulting give a mixture of hydrogen, carbon dioxide, carbon monoxide and other gases and is known as blue gas or blue water gas. The heating value of blue gas is in the neighborhood of 300 B. t. u. per cubic foot and in the manufacture of artificial gas in this manner it is customary to carburet the blue gas with a hydrocarbon such as gas oil or the like. Various hydrocarbons may be used. It is customary to inject the gas oil at the top or entrance of the carbureter by means of an oil spray or the like, and the gas oil or other hydrocarbon comes into contact with the heated checkerwork of the carbureter and is cracked thereby. The mixture of water gas and oil gas then passes through the heated checkerwork of the carbureter and into the heated checkerwork of the superheater. The latter is at a higher temperature than the checkerwork in the carbureter due to the cooling action of the sprays and incoming generator gases. The action of the carbureter, as is well understood, is to crack the hydrocarbons admitted.

In the drawing the reference numeral 35 indicates a conventional oil spray which receives a supply of gas oil or other fluid hydrocarbon from an oil line 36, the oil passing through an oil meter 37 and a proportioning valve 38 so as to provide an accurate control for the injection of the oil to the carbureter. After the process of carbureting the water gas as described above has been completed in the carbureter and fixed in the superheater the gas passes into and through the wash box in the conventional manner.

The production of gas by the above described method is not new and I have found that there are limits to the amount and characteristics of gas that can be successfully carbureted in the usual water gas set. The process described above can be continued by the injection of steam into the hot bed of carbon until the temperature of the carbon and the temperature of the carbureter is reduced to a point at which it will become necessary to continue the subsequent blast so long to bring the carbureter back to the desired temperature that the superheater temperature cannot be controlled and is raised beyond the desired point and the set consequently thrown out of balance.

Addressing myself to the problem of increasing the capacity and efficiency of water gas machines in order to increase the output thereof as well as to produce a gas which has a relatively high heating value, comparable, for example, to the heating value of natural gas, I have developed a means and method of handling the gas oil in such a way that sufficient quantities thereof can be added to the water gas and efficiently taken care of in order to accomplish the addition of sufficient gas oil to utilize the body of heat in the superheater whereby the output of the machine may be increased or whereby a gas having up to 1100 or more B. t. u.'s per cubic foot may be produced. As one possibility the present invention contemplates simultaneously adding the gas oil in two places. Mention has been made above of the use of the conventional oil spray at the top of the carbureter as an admission point in adding gas oil to enrich the product. The present invention contemplates providing another oil admission point, such as a spray or the like, indicated in the drawing by the reference numeral 40, and connecting this second oil spray by a line 41 with the gas oil supply pipe 36, using a conventional proportional valve 43 to control the amount of gas oil used. The second oil spray 40 may be disposed at the bottom or entrance of the superheater. After the first step or blast has been performed and the carbureter and superheater have been raised to the required temperature and the run started by the passage of steam through the hot bed of carbon in the generator, the gas oil is then introduced practically simultaneously at 35 and 40. The principal feature of this operation is, I believe, that both additions of hydrocarbon are volatilized and cracked by the hot checkerwork with which they immediately come into contact. The oil from the spray 35 is volatilized and cracked by the hot checkerwork 25 in the carbureter 11 and the oil spray from the spray 40 is volatilized and cracked by the checkerwork 28 in the superheater. Therefore, when the supply of the water gas from the conduit 20 passes through the carbureter and the superheater it picks up and is intimately mixed with, first, the cracked mass of hydrocarbon from the spray 35 and, second, the cracked mass of hydrocarbon from the spray 40. The various steps are indicated in the drawing by the solid line arrows and the accompanying legends. The continued passage of the water gas through the carbureter and superheater and the addition of the two quantities of gas oil produce a gas which may have a B. t. u. content of 1100 or better. The continued passage of the mixed gases through the superheater serves to fix the gases. It is to be understood, of course, that the principles of the present invention may be utilized in machines in which checkerwork is not present.

However, the cracking of the gas oil by the heat in the superheater is not the only desirable result secured, although it is advantageous and important. The injection of the gas oil into the superheater acts as a cooling medium, regardless of its capacity and function as an enriching agent. It was stated above that the rise in temperature of the superheater during the blast was a limiting factor on the operation of the set. Therefore the injection of the gas oil serves to cool the superheater and this will permit taking more heat from the carbureter without incurring the danger of overheating the superheater on the subsequent blast. If the superheater were not thus cooled during the run it would not be practical to take so much heat from the carbureter because the superheater would tend to become overheated when the carbureter is brought up to heat again. During the blasting operation it is therefore possible to utilize more efficiently the heat in the blast gases, for air may be introduced at 22 and the combustion of the remaining unburned portions of the blast gas completed, whereby the latter give up their heat to the checkerwork 28. Thus, the heat in these additional portions of the blast gases, which formerly was wasted, is now utilized to secure greater carburetion capacity, either to produce lower B. t. u. gases more efficiently or to produce higher B. t. u. gases. This last step would not be possible if the additional quantities of enriching oil were not added, as at 40.

Simultaneous injection of the gas oil into the carbureter and the superheater, that is, at two spaced points in the interconnected heated checkerwork, is not absolutely essential to the present invention. My invention also contemplates operating the machine by first introducing the gas oil into the carbureter in the usual manner until the temperature of the checkerwork has been reduced from 75 to 100 degrees, for example, and then, as a second step in the run, introducing the gas oil into the superheater until the temperature of the latter has been reduced to a point comparable to the drop in temperature of the carbureter. If desired, the gas oil may be introduced first into the superheater and then into the carbureter. Whether the injection is simultaneous or not, the effect is substantially the same, that is, the heat of the superheater which formerly served as a limiting factor is now utilized in producing additional amounts of gas or in producing a gas having a higher heating value. Thus, a very flexible system is produced which enables a station to meet increased demands, not only peak loads but emergency situations in which either a rich gas is needed to increase the capacity of the mains or in which a greater output is required to meet peak loads or, thirdly, to produce a gas having a high B. t. u. content to take the place of such gases as natural gas in case the supply of the latter is interrupted.

While I have described above the distinctive steps and structure in which the principles of the present invention are embodied, it will be apparent to those skilled in the art that my invention is not to be limited to the specific details included above, but that, in fact, widely different means may be employed in the practice of the broader aspects of my invention.

What I claim, therefore, and desire to secure by Letters Patent is:

1. In a water gas set having a carbureter and superheater, the method of storing and utilizing sufficient heat for the carburetion of the water gas by relatively large amounts of an enriching ingredient, which method comprises heating the carbureter and superheater to substantially the same predetermined temperature by blasting the carbureter and superheater in series, directing a flow of water gas serially through said carbureter and superheater, injecting into said flow of gas controlled amounts of said ingredient into both the carbureter and superheater, and controlling the proportions injected into each of the carbureter and superheater so as to reduce the temperature in said superheater in accordance with the heat extracted from the carbureter by said injection, again blasting said carbureter and superheater, and employing the excess heat remaining in the blast gases after the subsequent blast has restored the heat extracted from the carbureter for reheating said superheater to said predetermined temperature.

2. The method of manufacturing water gas for enriching a lean gas stream which comprises blasting a pair of serially connected chambers to substantially the same predetermined temperature, introducing gas into said chambers, spraying said gas with a hydrocarbon oil in said first chamber and simultaneously producing a predetermined cooling of said first chamber, passing the gas enriched with the injected oil into said second chamber, spraying said gas with an additional predetermined quantity of said hydrocarbon oil to enrich said gas as it passes into said second chamber and simultaneously producing a predetermined cooling of said second chamber, and proportioning the relative quantities of said hydrocarbon oil sprayed into said chambers whereby the cooling of said second chamber is sufficient to prevent heating thereof beyond said predetermined temperature by a subsequent blast of heated gases during reheating of said first chamber to said predetermined temperature.

EARL L. TORNQUIST.